United States Patent [19]
Thurston

[11] 3,965,921
[45] June 29, 1976

[54] CONTROLLED OPENING PRESSURE COMPENSATED FLOW CONTROL VALVE

[75] Inventor: David L. Thurston, Ashley, Ohio
[73] Assignee: Abex Corporation, New York, N.Y.
[22] Filed: Nov. 20, 1974
[21] Appl. No.: 525,418

Related U.S. Application Data
[63] Continuation of Ser. No. 260,946, June 8, 1972, abandoned.

[52] U.S. Cl. .................................................. 137/117
[51] Int. Cl.² .................... G05D 7/01; G05D 11/03
[58] Field of Search ............ 137/50, 116, 117, 269, 137/271, 489, 491, 501, 509, 514.7, 596.12, 596.18, 596.2; 91/361, 458; 132/736

[56] References Cited
UNITED STATES PATENTS

| | | | |
|---|---|---|---|
| 3,455,210 | 7/1969 | Allen | 137/117 |
| 3,602,104 | 8/1971 | Stremple | 137/117 |
| 3,827,453 | 8/1974 | Malott et al. | 137/117 |

FOREIGN PATENTS OR APPLICATIONS

| | | | |
|---|---|---|---|
| 1,274,806 | 8/1969 | Germany | 137/501 |

Primary Examiner—Martin P. Schwadron
Assistant Examiner—George L. Walton
Attorney, Agent, or Firm—Thomas S. Baker, Jr.; David A. Greenlee

[57] ABSTRACT

A flow control valve for use in a hydraulic system including a variable orifice for creating a pressure drop to control the rate of fluid flow to a fluid pressure operated device. A pressure compensating device incorporated in the valve is responsive to deviations in pressure drop across the orifice to modulate the flow thereto and thereby maintain a preselected pressure drop across the orifice. Opening of the variable orifice is by inlet pressure against the force of a light spring to an adjustable stop. Retarding opening of the orifice is an expansible chamber having variable volume and connected through an adjustable flow restriction valve to the control valve outlet. Adjustment of the flow restriction valve controls the rate of opening of the variable orifice to reduce pressure shock to the hydraulic system upon initiation of flow.

3 Claims, 2 Drawing Figures

CONTROLLED OPENING PRESSURE COMPENSATED FLOW CONTROL VALVE

This application is a continuation of application Ser. No. 260,946, filed June 8, 1972, now abandoned.

BACKGROUND OF THE INVENTION

This invention relates generally to flow control devices and more particularly to a pressure compensated flow control valve.

Flow control valves have been used for many years in hydraulic systems to regulate quantity of fluid delivered to an actuator or other fluid operated device. Early valves comprised a simple variable orifice which created a given pressure drop across the orifice and for a given inlet pressure accurately controlled the flow rate of fluid to the device. However, any fluctuation in such inlet pressure would cause a variation in flow rate. Thus, to overcome that, a pressure compensator was added to automatically adjust the flow to the variable orifice in response to variations in the pressure drop across the variable orifice. Such a flow control apparatus with precision control is shown in U.S. Pat. No. 3,159,178 to Adams, for example.

Flow control devices of the type above described generally function appropriately. However, one problem encountered is that the variable orifice is normally in an open position. Thus, abrupt initiation of flow at a given pressure will suddenly open the variable orifice and effect a hydraulic shock throughout the hydraulic system.

Recognition of this problem and a solution thereto is shown in U.S. Pat. No. 3,406,714 to Meisel which patent relates to an Anti-Surge Flow Control Valve wherein the pressure compensator is biased to a closed position and then is fully opened upon application of pressure to the valve. However, the valve design as disclosed is extensively complicated and also would be substantially expensive and time consuming to manufacture.

SUMMARY OF THE INVENTION

The object of the present invention is to provide a pressure-compensated flow control device having means for preventing pressure surges or shocks upon abrupt initiation of flow into and through the device.

Other objects and advantages of the invention are attained by a pressure fluid flow control device according to this invention comprising a body having an inlet for receiving pressure fluid from a source, an outlet for discharging pressure fluid to a pressure fluid-operated device, a variable orifice for regulating fluid flow to the outlet, and pressure compensating means between the inlet and variable orifice responsive to deviations from a predetermined pressure drop across the orifice to control the supply of fluid to the orifice. An incorporated biasing means biases the orifice to a closed position. Pressure responsive means is provided for opening the orifice, and adjustable limit means is provided for selectively varying the maximum orifice size. The invention in the foregoing combination includes control means for controlling the rate of opening of the orifice to reduce pressure shock to the pressure fluid device as the orifice opens. A selectively variable flow control means is provided for varying the rate of opening of the variable orifice.

These and further objects and features of this invention become more readily apparent upon reference to the following detailed description of the annexed drawings.

DESCRIPTION OF THE PREFERRED EMBODIMENTS

Figure 1:
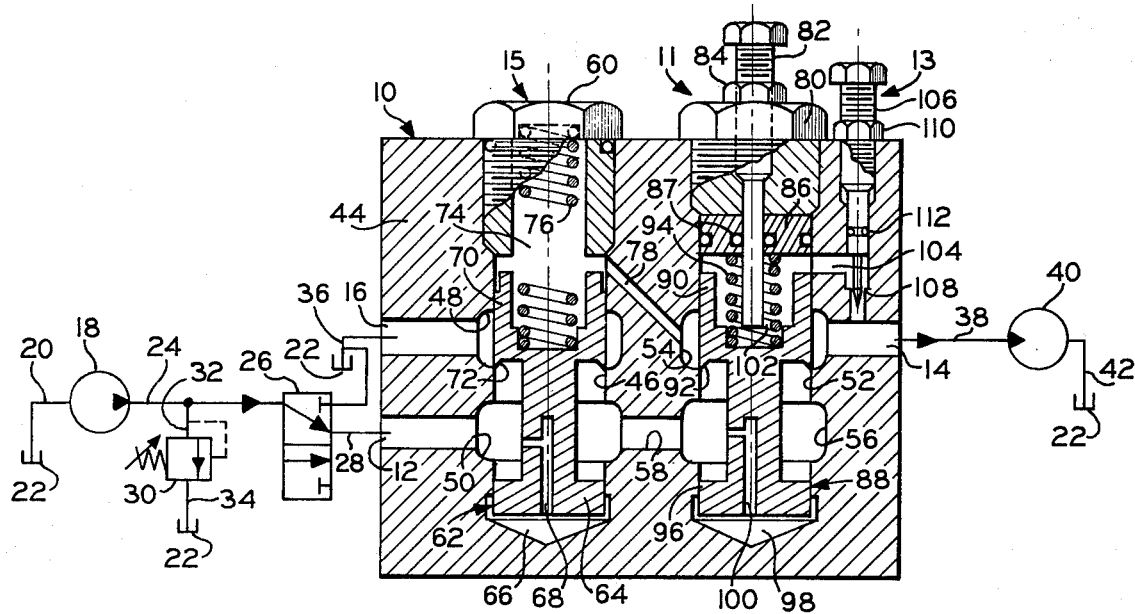
FIG. 1 is a schematic representation of a hydraulic circuit showing a three-port flow control device incorporating this invention.

Referring to FIG. 1, there is shown a valve 10 embodying the present invention. Valve 10 generally includes a control valve structure 11, a control valve opening rate structure 13 and a compensating valve structure 15 as shown.

Valve 10 is provided with an inlet port 12, an outlet port 14 and a bypass or return port 16. Valve 10 is shown in working connection with an illustrative hydraulic circuit including a positive displacement pump 18 connected through a conduit 20 to a fluid source reservoir or tank 22 and through a discharge conduit 24, a switch valve 26, and a conduit 28 into port 12 of the valve 10. The function of valve 26 is to direct fluid from pump 18 into valve 10 while in a first position as shown and to direct such fluid back into tank 22 while in a second position.

A pressure relief valve 30 (which may be adjustable as shown or preset) is connected into discharge conduit 24 through a conduit 32 and to tank 22 through a conduit 34. The function of relief valve 30 is to provide an upper limit of fluid pressure from pump 18 by by-passing excess fluid to tank when such upper pressure limit is reached. Though not shown, a pressure rise limiting valve such as disclosed in U.S. Pat. No. 3,578,018 may be appropriately connected as desired with conduit 24 under some conditions to prevent high transient pressures as may be caused by switching of a valve such as valve 26.

Return port 16 of valve 10 is connected through a conduit 36 into tank 22. Discharge or outlet port 14 of valve 10 is connected through a conduit 38 to a work source illustrated as a fluid motor 40 having an exhaust connected through a conduit 42 to tank 22. The valve 10, as will later become apparent, may be advantageously employed with various kinds of work sources such as rotary fluid motors as shown, pistons and cylinders and the like where an abrupt initial application of full fluid working pressure would be undesirable if detrimental.

Referring further to valve 10, there is shown a body 44 defining a compensator bore 46 having an upper annular groove 48 in communication with return port 16 and a lower annular groove 50 in communication with inlet port 12. Body 44 also defines a flow control bore 52 having an upper annular groove 54 in communication with outlet port 14 and a lower annular groove 56 in communication with the lower annular groove 50 of bore 46 through a passageway 58.

The open end of compensator bore 46 is threaded to receive a hollow externally threaded closure plug 60 as shown. The lower portion of bore 46 receives a pressure compensator valve spool 62. Valve spool 62 includes a lower head 64 which seats against a conical lower end of bore 46 to define a pressure chamber 66 as shown. Spool 62 defines a radial bore intersecting an axial bore to provide a passageway 68. Passage 68 permits fluid under pressure entering inlet port 12 to bias spool 62 upwardly. Spool 62 also includes an upper hollow head 70 which has a valving flange 72 which, when moved in bore 46 adjacent the lower lip of annular groove 48, constitutes a variable flow area fluid throttling valve between inlet port 12 and return port 16.

Upper head 70 and closure plug 60 define an upper compensator chamber 74 in which a spring 76 is situated under precompression between and within valve spool 62 and plug 60 as shown. Fluid and pressure communication between chamber 74 and upper flow control groove 54 is provided by a passageway 78 defined through valve body 44 as shown. As shown, the downward bias provided by spring 76, as supplemented by force from fluid pressure appearing in annular groove 54 and into chamber 74, opposes the upward force created by inlet fluid pressure into lower chamber 66 toward closing off fluid communication past valving flange 72 and between ports 12 and 16. The compressional force exerted by spring 76 is preselected and of importance in the desired functioning of the compensator valve as later mentioned.

The upper end of flow control bore 52 is threaded to receive an externally threaded plug 80. Plug 80 defines an axially disposed through threaded bore which receives an externally threaded stop member or pin 82. Stop pin 82 is axially adjustable and is locked in a desired position by a lock nut 84 as shown. A retainer bushing 80 abuts the lower end of plug 80 and carries internal and external O-ring seals 87 as shown to seal bushing 80 within bore 52 and about the shank of stop pin 82.

The lower end of bore 52 receives a slidable flow control spool 88. Spool 88 includes a hollow upper head 90 which defines a control valve flange 92. Movement of spool 88 causes movement of flange 92 adjacent the lower lip of annular groove 54 to constitute a variable flow control area and flow control action for fluids discharged from outlet port 14.

The maximum upward movement of spool 88 and corresponding maximum flow area permitted by flange 92 is limited by axial abutment of spool 88 against the adjustable stop pin 82.

A return sring 94 is interposed in compression between retainer bushing 86 and spool 88 and within head 90 as shown to bias the spool downwardly toward closed position. Control valve spool 88 also includes a lower head 96 which seats against a conical lower end of bore 52 to define a pressure chamber 98 as shown. Spool 88 defines a radial bore intersecting an axial bore to constitute a passageway 100. Passage 100 permits fluid under pressure entering through passage 58 to enter chamber 98 and bias the valve upwardly toward an open position.

A confined chamber 102 of variable volume is defined in bore 52 between upper head 90 and retainer bushing 86. A passageway 104 is defined within body 44 between chamber 102 and outlet port 14 to permit exit or entry of fluid into the chamber responsive to vertical movement of spool 88 and corresponding opening and closing of the valve opening structure 11 at flange 92. An adjustable flow restriction structure 13, illustrated as a threaded needle valve 106 received in a threaded bore to engage a seat 108 in body 44, serves to restrict the rate of flow of fluid from chamber 102 as displaced by upward movement of upper head 90 of spool 88. The shank of needle valve 106 is grooved to receive an O-ring fluid seal 112 as shown.

Accordingly, adjustment of needle valve 106 to control the rate of flow from chamber 102 causes corresponding adjustment of the rate of opening of the flow control orifice flow area at flow control flange 92. Thus, when fluid pressure is abruptly applied through passages 58 and 100 into chamber 98, the spool 88 including control valve flange 92 can move upwardly at a rate no greater than permitted by displacement of fluid from chamber 102 past needle valve 106.

After adjustment, needle valve 106 is locked in the adjusted position by means of a lock nut 110.

The coordination and interaction of the above described component parts will become apparent from the following described operation of the structure shown in FIG. 1. Valve 26 is shown at the instant that it has been switched to direct fluid under pressure into inlet port 12. At this time flow has not started through valve 10 and compensator spool 62 of valve structure 15 is biased by spring 76 with compensator valving flange 72 closing off return port 16. Control valve spool 88 is also biased to its lower position by return spring 94.

As fluid pressure enters inlet 12 such pressure is transmitted through spool passages 68 and 100 into chambers 66 and 98 and begins to urge or bias spools 62 and 88 upwardly. The rate of opening of the control valve structure 11 opening at control flange 92 is regulated as desired by regulation of the discharge rate of fluid from chamber 102 past needle valve 106. The opening rate or time of the control valve is set by adjustment of needle valve 106 to be commensurate with the fluid pressure involved and the type and requirements of work source 40 to prevent any unacceptable or undesirable shock loading into the system of work source 40.

While the control valve is opening the compensator moves upwardly to open the valve area at valving flange 72 as far as permitted by abutment of spool head 70 with closure plug 60. At such time, fluid is bypassed through outlet port 16 to tank 22 but leaving adequate pressure impressed into chamber 98 to continue biasing the control valve spool 88 and valve flange 92 into fully opened position as determined by the adjusted position of stop member or pin 82.

As the control valve structure 11 continues to open, fluid under pressure is gradually admitted to work source 40 as previously mentioned. Such fluid pressure is also gradually admitted through passageway 78 into compensator chamber 74 and begins to be impressed downwardly on compensator head 70 and thereby bias spool 62 and flow control flange 72 toward closing off flow through outlet port 16. As flow through outlet port 16 begins to decrease the pressure in grooves 50 and 56 begins to increase with corresponding pressure increase in chambers 66 and 98. The pressure in chamber 98 ultimately holds control valve spool 88 with valve flange 92 in wide open control position as permitted by the adjusted position of stop pin 82.

The pressure in compensator chamber 66 and corresponding upward force proceeds to equilibrium with the downward force jointly impressed by spring 76 and the downstream pressure from the control valve which is transmitted through passageway 78 into compensator chamber 74. At this stage compensator spool is positioned to bypass fluid past control flange 72 and through outlet port 16 which fluid would cause an excess in pressure as required to maintain the equilibrium condition described above.

It may readily be seen from the foregoing description and reference to FIG. 1 that the operating differential pressure across the control valve structure 11 at control flange 92 is a direct function of the force exerted by spring 76 of compensator valve structure 15. Accordingly, the size, spring rate and precompression of spring 76 are all factors to be selected for a particular pressure differential across the control valve at control flange 92. With valve 10 provided as shown the flow rate through the valve is selected by adjustment of stop member 82 with the differential pressure across the control valve being maintained constant by the compensator valve structure 15 as described. With a constant flow area through control structure 11 and a constant pressure differential maintained across valve structure 11 there is maintained an essentially constant rate of fluid flow through valve even with variations in fluid pressure at inlet port 12 and/or outlet port 14.

Figure 2:
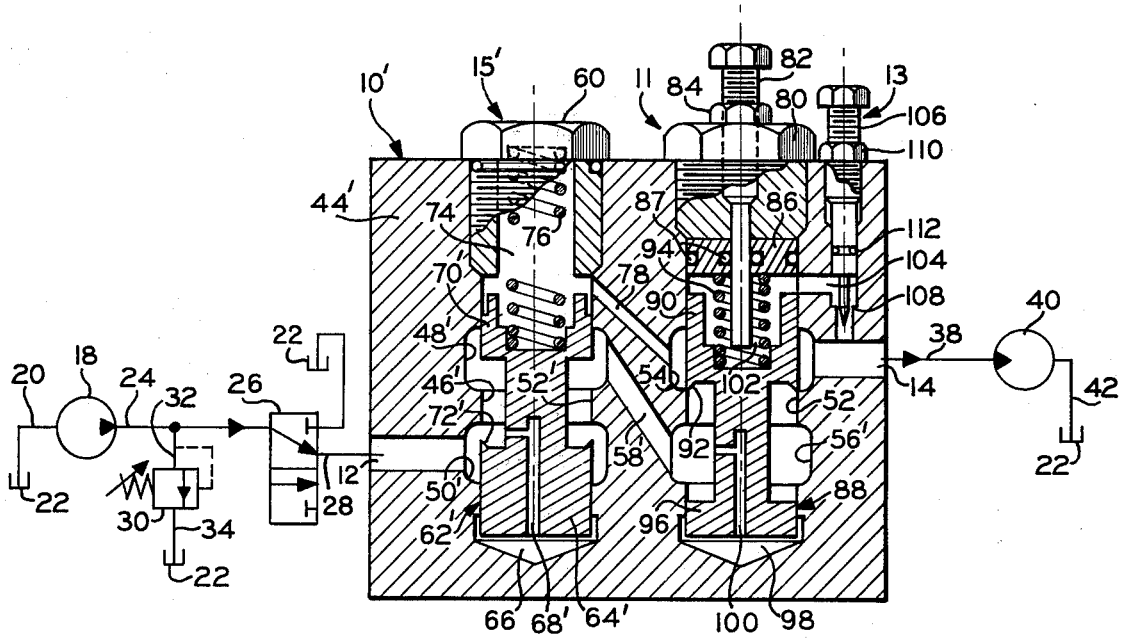
FIG. 2 is similar to FIG. 1 and illustrates a two-port flow control device incorporating this invention.

Referring to FIG. 2 in view of FIG. 1, there is shown an alternate embodiment of valve 10 of the present invention in which is provided two ports rather than three ports as above described. As readily seen, the principal modifications are the elimination of outlet port 16, the modification of compensator valve spool 62 of compensating valve structure 15 and a revision in the flow communication of passageway 58. The elements of the valve 10 of FIG. 2 which are the same as the valve 10 of FIG. 1 are identified by the same numbers and the elements of the valve 10 in FIG. 2 which have been modified in function or structure are identified by corresponding primed numbers.

As shown in FIG. 2, valve body 44' of valve 10' has been modified wherein there is no outlet port to tank from upper annular groove 48' and passageway 58' is defined in communication between upper groove 48' of compensator bore 46' and lower groove 56' of flow control bore 52'.

Compensator valve spool 62' of valve structure 15' is provided with a lower valving head 64' which defines a lower pressure chamber 66 within compensator bore 46'. A compensator valving flange 72' is defined around the upper periphery of lower head 64' which, when moved in bore 46' adjacent the upper lip of annular groove 50', constitutes a variable flow area fluid throttling valve to modulate entry of fluid into valve 10'. As the valving flange 72' moves upwardly toward closure, any fluid discharged by pump 18 which is in excess of the fluid entering the valve 10' is bypassed to tank 22 through relief valve 30.

A passageway 68' comprising a radial bore intersecting an axial bore defined within compensator valve spool 62' as shown provides fluid communication between fluid chamber 66 and groove 48' downstream of valving flange 72'. It is to be noted that such construction causes the fluid pressure within valve body 44' between valving flange 72' and flow control flange 92 to be substantially the same including the pressures in lower chambers 66 and 98.

In operation the compensating valve at flange 72' goes nearly closed but not completely closed upon application of fluid under pressure from inlet port 12 in response to fluid pressure impressed through passageway 68' into chamber 66. Corresponding pressure impressed into chamber 98 causes the control valve at flange 92 to start opening as previously described with respect to the embodiment of FIG. 1. After control valve is fully opened against stop pin 82, the compensator valve establishes an equilibrium condition and control of the pressure differential across the control valve at control flange 92 as described for FIG. 1.

It is now seen that the principal difference in operation of the alternate valves of FIGS. 1 and 2 is that excess fluids from pump 18 are returned to tank 22 through outlet port 16 in FIG. 1 and returned to tank 22 through relief valve 30 in FIG. 2.

Should it be desirable in some applications of valve 10 that the control valve spool 88 of valve structure 11 quickly return to closed position when valve 26 is switched to close off fluid flow into inlet port 12, a biased check valve (not shown) may be provided in parallel connection across needle valve 106 and seat 108 to permit free fluid re-entry into chamber 102 without disturbing the rate setting of needle valve 106.

The respective three port and two port embodiments of the control valve of the present invention as disclosed herein have respective applications in certain systems as will be apparent to those skilled in hydraulic power systems.

The foregoing description and drawing will suggest other embodiments and variations to those skilled in the art, all of which are intended to be included in the spirit of the invention as herein set forth.

That being claimed is:

1. An automatic pressure fluid flow control device, comprising: a valve body; an inlet in the body for receiving pressure fluid from a source; an outlet in the body for discharging pressure fluid to a pressure fluid operated device; a normally closed variable orifice for regulating fluid flow to the outlet; a fluid passage for conducting pressure fluid to the variable orifice; pressure compensating means for regulating fluid flow from the inlet to the fluid passage including a compensating member, biasing means biasing the compensating member to an inoperative position permitting full fluid flow from the inlet to the fluid passage, first fluid pressure responsive means connected to the fluid passage for biasing the compensating member out of the inoperative position to reduce fluid flow to the flow control valve means, and second fluid pressure responsive means connected to the outlet opposing the first fluid pressure responsive means; biasing means biasing the orifice to its normally closed position; third fluid pressure responsive means connected to the fluid passage for opening the orifice when fluid in the fluid passage exceeds a predetermined pressure; adjustment means for selectively varying the maximum orifice opening; fourth fluid pressure responsive means opposing the third fluid pressure responsive means to oppose opening of the orifice; conduit means connecting the fourth fluid pressure responsive means to the outlet; and restricting means in the conduit means to limit the flow of fluid from the fourth fluid pressure responsive means to the outlet to control the rate of opening of the orifice as the orifice opens.

2. The valve of claim 1 characterized in that the restricting means include an adjustable needle valve.

3. An automatic pressure fluid control device, comprising: a valve body; an inlet in the body for receiving pressure fluid from a source; an outlet in the body for discharging pressure fluid to a pressure fluid operated device; a normally closed variable orifice for regulating fluid flow to the outlet; a fluid passage for conducting pressure fluid to the variable orifice; pressure compensating means for regulating fluid flow from the inlet to the fluid passage including a compensating member, biasing means biasing the compensating member to an inoperative position permitting full fluid flow from the inlet to the fluid passage, first fluid pressure responsive means connected to the fluid passage for biasing the compensating member out of the inoperative position to reduce fluid flow to the flow control valve means, and second fluid pressure responsive means connected to the outlet opposing the first fluid pressure responsive means; biasing means biasing the orifice to its normally closed position; third fluid pressure responsive means connected to the fluid passage for opening the orifice when fluid in the fluid passage exceeds a predetermined pressure; adjustment means for selectively varying the maximum orifice opening; fourth fluid pressure responsive means opposing the third fluid pressure responsive means to oppose opening of the orifice; conduit means connecting the fourth fluid pressure responsive means to the outlet; a second fluid passage connecting the first fluid passage to reservoir, the compensating member including means alternatively movable between a first position in which the second fluid passage is blocked when the compensating member is in the inoperative position and a second position in which the fluid passage is open and pressure fluid is passed to reservoir when the compensating member is in the operative position; and restricting means in the conduit means to limit the flow of fluid from the fourth fluid pressure responsive means to the outlet to control the rate of opening of the orifice as the orifice opens.

* * * * *